Oct. 28, 1969   K. S. DEFFEYES ET AL   3,475,679
METHOD FOR DETERMINING SAND GRAIN IMBRICATION ANGLE
Filed Jan. 16, 1968
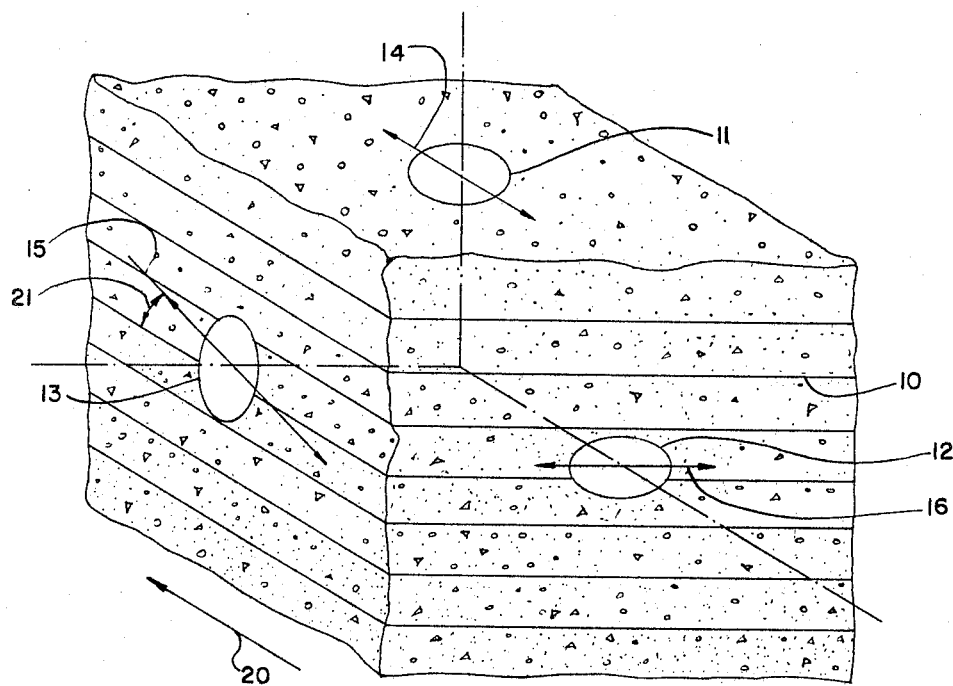
INVENTORS:
K.S. DEFFEYES
W. R. ORR
BY:
THEIR ATTORNEY

United States Patent Office 3,475,679
Patented Oct. 28, 1969

3,475,679
METHOD FOR DETERMINING SAND GRAIN IMBRICATION ANGLE
Kenneth S. Deffeyes, Princeton, N.J., and William R. Orr, Bellaire, Tex., assignors to Shell Oil Company, New York, N.Y., a corporation of Delaware
Filed Jan. 16, 1968, Ser. No. 698,265
Int. Cl. G01v 3/08
U.S. Cl. 324—1                                     3 Claims

ABSTRACT OF THE DISCLOSURE

A process for determining the imbrication angle of a sand formation wherein the formation is first stressed in a plurality of directions parallel to the bedding plane and the direction of maximum response measured. The formation is then stressed in a plurality of directions in a plane that includes the normal to the bedding plane and the direction of maximum response of the first stressing. The direction of maximum response to the second stressing is measured to obtain the imbrication angle of the formation.

Background of the invention

The present invention relates to geophysical exploration and more particularly, to a method for determining the specific direction or sense of current flow (i.e., toward a specific one of the 360 degrees of azimuthal direction) in a sand formation at the time that the sand was deposited. U.S. Patent No. 2,963,641 describes a method for determining the geographical direction along which the sand was most extensive at the time the sand was deposited. The patent describes a method in which the sand formation is stressed in a plurality of directions parallel to the bedding plane and then measuring the direction of maximum response of the sand to the stress. The direction of maximum response provides a measurement of the geographical direction along which the sand was most extensive at the time it was deposited. While this method determines the geographical direction, no indication is given of the specific direction or sense of the air or water current flow at the time the sand was deposited.

As explained in the above patent, sand formations are of interest in the search for petroleum deposits since most petroleum deposits are located in or near sand formations. The location of sand formations that are likely to contain petroleum deposits can often be made by seismic, gravitational or other methods. In cases where these methods fail, other methods must be used as explained in the above-referenced patent. The method of the above-referenced patent permits one to determine the geographical direction along which the individual grains of the sand formation were deposited at the time the formation was created and thus permits one to determine the likely direction of a petroleum-containing sand formation. While the invention provides an indication of the geographical directon along which the sand was deposited, it provides no information regarding the senses of the current flow. At times, additional information can be used to determine the sense of current flow, although at other times only an estimation can be made.

Summary of the invention

The present invention solves the above problem by providing a method by which the ambiguity of current flow direction can be resolved. More particularly, the present invention measures the direction of preferred common alignment of the grains utilizing the method described in Patent 2,963,641. The invention then determines the direction of the air or water current flow by measuring the imbrication angle of the sand grains. The term "imbrication angle" is defined as the angle between the long axis of the sand grains and the plane of the bedding. All sand grains have a generally ellipsodial shape and tend to align their long axis with the direction of the current flow as they are deposited. Further, the sand grains tend to be asymmetrical, and thus their heavier ends tend to come to rest first and prevent their long axis from aligning parallel with the bedding planes. The imbrication angle is determined by stressing the formation in a plurality of directions in a plane that includes the direction of common alignment and the normal to the bedding plane. The direction of maximum response of the formation to the stressing is then determined in order to measure the imbrication angle. The sense of current flow is then in the direction in which the imbrication angle rises above the bedding plane of the formation.

The present invention may be practiced utilizing measurements of the type described in patents 2,963,642, 3,151,292 or 3,014,177 and 3,187,252. The measurements described in the latter two patents are preferred, since they can be used to detect both the direction of common alignment of the sand grains and their imbrication angle during a single trip of a logging tool through a borehole. Utilizing the method of the Patent 2,963,641 requires either the use of core samples, two separate tools in a single logging instrument or separate logging runs through the borehole.

Where core samples are used, the measurements are preferably made by means of conductivity anisotropy measurements of the type described in U.S. patent application Serial No. 59,008, filed September 28, 1960, now abandoned.

Brief description of the drawings

The above advantages of this invention will be more easily understood from the following detailed description of a preferred embodiment when taken in conjunction with the attached drawing showing a cube of sand material with three representative cores taken along its principal axis.

Referring now to the drawing, there is shown a cube of a sand formation having substantially horizontal bedding planes 10. While the bedding planes are assumed to be horizontal the invention would apply equally well to formations where the bedding planes dip. As shown in the drawing, cylindrical cores 11, 12, 13 are taken along three major orthogonal axes of the formation sample. The three major axes are (1) normal to the bedding plane, (2) parallel to the direction of maximum response in the bedding plane and parallel to the bedding plane and (3) perpendicular to the direction of maximum response in the bedding plane and parallel to the bedding plane. When these cores are checked for the direction of their predominant alignment, as for example by using the equipment described in Patent 2,963,642, one would obtain directions of the predominant alignment of the sand grains corresponding to vectors 14, 15 and 16. It should be noted that the vector 14 corresponds to the predominant geographical direction of the grain alignment. After one obtains the vector 14, core sample 13 whose axis lies in the bedding plane and is perpendicular to vector 14 can be checked to determine the imbrication angle. As shown in the drawing, the vector 15 represents the predominant alignment of the sand grains in the core 13 and the angle between vector 15 and the bedding plane (20) is the imbrication angle (21). Assuming the imbrication angle 21 is as shown and that the top of the cube corresponds to the upper surface of the sample when it was removed from the earth, then the air or water current that originally deposited the sand grains would have been flowing in a sense indicated by the arrow 20.

From the above description it can be appreciated that this invention utilizes the following steps to determine the imbrication angle of the formation sand grains. First, the direction of predominant alignment of the sand grains is determined following the method described in Patent 2,963,641. After, or concurrent with a determination of the predominant direction of alignment of the sand grains, the imbrication angle is determined by stressing the formation a second time in a plurality of directions in a plane that includes the direction of the preferred alignment of the sand grains and is normal to the bedding plane. The response of the formation to the stressing in a plane that includes the direction of preferred alignment is then measured. The angle between the direction of maximum response and the bedding plane is the imbrication angle of the individual sand grains.

These steps, of course, can be performed in a borehole providing a measurement is made of both the response of the formation to the stressing in a direction parallel to the bedding planes and in a direction that is normal to the bedding planes. This can be accomplished utilizing two rotating coils disposed with their axes at right angles as discussed in the Patent No. 3,187,252. The coils will provide signals that are related to both the preferred alignment of the sand grains in a direction parallel to the bedding plane and the imbrication angle of the grains.

We claim as our invention:

1. A process for determining the imbrication angle of a sand formation comprising:
   stressing the formation in a plurality of directions parallel to the bedding plane;
   measuring the direction of the maximum response to said stressing;
   stressing the formation a second time in a plurality of directions in a second plane containing the direction of maximum response and the normal to the bedding plane; and
   measuring the direction of a second maximum response to said second stressing in said second plane normal to the bedding plane, the angle between said second direction and the bedding plane being equal to the imbrication angle.

2. The process of claim 1 wherein cores are taken along the three major orthogonal axes of a formation and the direction of maximum response in each core is measured perpendicular to its axis.

3. The process of claim 2 wherein the direction of maximum response is first measured in a core whose axis is perpendicular to the bedding planes, and the next direction of maximum response is measured in a core whose axis lies in the bedding plane.

References Cited

UNITED STATES PATENTS

| | | | |
|---|---|---|---|
| 2,963,641 | 12/1960 | Nanz | 324—13 |
| 2,963,642 | 12/1960 | Arbogast et al. | 324—13 |
| 3,014,177 | 12/1961 | Hungerford et al. | 324—8 |
| 3,151,292 | 9/1964 | Orr | 324—13 |
| 3,187,252 | 6/1965 | Hungerford | 324—6 |
| 3,337,797 | 8/1967 | Matay | 324—14 XR |

GERARD R. STRECKER, Primary Examiner

U.S. Cl. X.R.

324—13